(12) United States Patent
Wells et al.

(10) Patent No.: US 8,799,816 B2
(45) Date of Patent: Aug. 5, 2014

(54) DISPLAY INTERFACE AND METHOD FOR DISPLAYING MULTIPLE ITEMS ARRANGED IN A SEQUENCE

(75) Inventors: Andrew K. Wells, Lindenhurst, IL (US); Kitae Kim, Dallas, TX (US); Dmitry N. Tylik, St. Petersburg (RU)

(73) Assignee: Motorola Mobility LLC, Libertyville, IL (US)

( * ) Notice: Subject to any disclaimer, the term of this patent is extended or adjusted under 35 U.S.C. 154(b) by 468 days.

(21) Appl. No.: 12/961,469

(22) Filed: Dec. 6, 2010

(65) Prior Publication Data

US 2011/0138329 A1 Jun. 9, 2011

Related U.S. Application Data

(60) Provisional application No. 61/267,434, filed on Dec. 7, 2009.

(51) Int. Cl.
*G06F 3/0485* (2013.01)
(52) U.S. Cl.
USPC .......................................... 715/830; 715/832
(58) Field of Classification Search
CPC .............................. G06F 3/0362; G06F 3/0485
USPC ................................................. 715/200–867
See application file for complete search history.

(56) References Cited

U.S. PATENT DOCUMENTS

| 6,990,637 B2 * | 1/2006 | Anthony et al. | 715/851 |
| 7,479,949 B2 * | 1/2009 | Jobs et al. | 345/173 |

(Continued)

FOREIGN PATENT DOCUMENTS

| EP | 2045703 A2 | 4/2009 |
| WO | 2004063862 A2 | 7/2004 |
| WO | 2006126047 A1 | 11/2006 |

OTHER PUBLICATIONS

"Equivalent". (2012). Merriam-Webster Online Dictionary. Accessed Oct. 9, 2012 at http://www.merriam-webster.com/dictionary/equivalent.*

(Continued)

*Primary Examiner* — William Bashore
*Assistant Examiner* — Linda Huynh
(74) *Attorney, Agent, or Firm* — Shumaker & Sieffert, P.A.

(57) ABSTRACT

A display interface and method for displaying multiple items arranged in a sequence are provided for presenting to the user via the display the multiple items along one of multiple paths as the user scrolls through the items. The display interface includes a display, a user input and a controller. The display is adapted for visually presenting to the user the multiple items from the group of items arranged in the sequence. The user input is adapted for receiving at least one of multiple different user gestures. The controller is adapted for comparing a received user gesture with one of a plurality of predefined gestures which are intended to signal a desire to scroll through the group of items arranged in the sequence, where as the group of items are scrolled through, a different subset of multiple items from the group of items arranged in the sequence are presented to the user via the display. If a first one of the plurality of predefined gestures is received, the multiple items from the group of items arranged in the sequence are presented to the user via the display along a first path on the display. If a second one of the plurality of predefined gestures is received, the multiple items from the group of items arranged in the sequence are presented to the user via the display along a second path on the display, which is different from the first path.

18 Claims, 8 Drawing Sheets

(56) References Cited

U.S. PATENT DOCUMENTS

| | | | |
|---|---|---|---|
| 7,581,186 B2* | 8/2009 | Dowdy et al. | 715/727 |
| 7,903,115 B2* | 3/2011 | Platzer et al. | 345/473 |
| 8,365,091 B2* | 1/2013 | Young et al. | 715/784 |
| 8,375,334 B2* | 2/2013 | Nakano et al. | 715/848 |
| 2004/0100479 A1* | 5/2004 | Nakano et al. | 345/700 |
| 2005/0180330 A1* | 8/2005 | Shapiro | 370/241 |
| 2007/0132789 A1* | 6/2007 | Ording et al. | 345/684 |
| 2008/0155475 A1* | 6/2008 | Duhig | 715/830 |
| 2008/0168384 A1* | 7/2008 | Platzer et al. | 715/784 |
| 2008/0288880 A1* | 11/2008 | Reponen et al. | 715/764 |
| 2009/0002335 A1* | 1/2009 | Chaudhri | 345/173 |
| 2009/0319892 A1* | 12/2009 | Wright et al. | 715/701 |
| 2010/0134425 A1* | 6/2010 | Storrusten | 345/173 |
| 2010/0175027 A1* | 7/2010 | Young et al. | 715/830 |
| 2010/0281374 A1* | 11/2010 | Schulz et al. | 715/723 |
| 2011/0055753 A1* | 3/2011 | Horodezky et al. | 715/810 |
| 2011/0090255 A1* | 4/2011 | Wilson et al. | 345/647 |
| 2011/0093812 A1* | 4/2011 | Fong | 715/810 |
| 2012/0036473 A1* | 2/2012 | Haseyama et al. | 715/784 |
| 2012/0072870 A1* | 3/2012 | Akifusa | 715/830 |

OTHER PUBLICATIONS

Leithinger, Daniel et al.: "Improving Menu Interaction for Cluttered Tabletop Setups with User-Drawn Path Menus", Horizontal Interactive Human-Computer Systems, 2007, Tabletop '07, Second Annual IEEE International Workshop on, IEEE, Piscathaway NJ, USA, Oct. 1, 2007, pp. 121-128.

Patent Cooperation Treaty, International Search Report and Written Opinion of the International Searching Authority for International Application No. PCT/US2010/059226, Apr. 5, 2011, 15 pages.

* cited by examiner

DISPLAY INTERFACE AND METHOD FOR DISPLAYING MULTIPLE ITEMS ARRANGED IN A SEQUENCE

FIELD OF THE INVENTION

The present invention relates generally to a device and a method for displaying multiple items arranged in a sequence, and more particularly, to supplying one of multiple forms of scrolling gestures and adjusting the manner in which the multiple items are displayed based upon the particular gesture detected.

BACKGROUND OF THE INVENTION

Portable electronic devices have become increasingly sophisticated often merging the functionality that was previously associated with multiple dedicated devices into a single device. In some cases, the merging of traditionally distinct functionality is used as a way to initially distinguish one's product from other products in the market place and to enable a user to potentially satisfy multiple needs or desires previously requiring the user to have multiple different devices.

As devices having combined merged sets of features in a single device become more popular, the features tend to become standard on all such devices. For example, the ability to take pictures and listen to music have almost become standard features for many cell phones. In some cases the incorporation of multiple previously distinct functions will allow for synergistic effects when combined to operate on a single device, which can sometimes enhance the overall experience, and are only conveniently possible on a device which merges the two previously separate functions. For example, on a wireless communication device, such as a cell phone that incorporates a camera for taking pictures, one can more conveniently send a picture recently obtained with the picture capture capability to friends or family using the wireless communication capability of the device within moments of having taken the picture.

However often the previously separate devices had very distinct forms of interfaces with which the user interacted, and so in some instances there can be a challenge in effectively accommodating two previously distinct forms of user interfaces to support the features now present in a single device. In order to help accommodate a less static and/or more varied interface, devices have moved towards more generic and in some ways more flexible user interfaces that can be configured to support multiple different types of interfaces. Some devices have provided for larger display screens and touch sensitive surfaces which can be more readily reconfigured to accommodate a more varied form of user interaction, which can then be tailored more specifically to the currently active use mode. In some cases the touch sensitive surface has been merged with the display screen to allow for larger displays and to enable the user to interact with displayed elements.

The more flexible user interfaces and larger displays have created an opportunity to further enhance the user experience in other areas. For example, it has made possible larger graphical user interfaces, that enable a greater level of detail. Sets of selectable items previously conveyed as text descriptors in a menu, in some instances have given way to graphical representations, which are readily associated with the items being selected. Album/CD artwork has been used to allow for selections within lists of music. The artwork will have an artistic style that can be readily distinguished with various pictures and color, which are a little more distinguishing at a faster glance than merely a textual description or title. There is a further preference for fluid and natural movement, that can make it easier to follow a series of images moving across the screen as one scrolls through a sequence of possible selections. However, at different scroll speeds there may be a preference for more or less detail, a preference for being able to see more or less of the selections at any one time, and/or a preference for a particular selection to remain on the screen for a particular period of time. The period of time may correspond to an amount of time, which might enable recognition and still provide time to select, if desired.

Correspondingly, the present inventors have recognized that it would be beneficial to enable multiple forms of scrolling that can be better tailored to some of the selected use modes, which provide a more natural flow, while providing a pleasing level of detail and an observation and selection time commensurate with one of multiple scroll speeds.

SUMMARY OF THE INVENTION

The present invention provides a display interface for presenting to a user of an electronic device multiple items from a group of items arranged in a sequence. The display interface includes a display, a user input and a controller. The display is adapted for visually presenting to the user the multiple items from the group of items arranged in the sequence. The user input is adapted for receiving at least one of multiple different user gestures. The controller is adapted for comparing a received user gesture with one of a plurality of predefined gestures which are intended to signal a desire to scroll through the group of items arranged in the sequence, where as the group of items are scrolled through, a different subset of multiple items from the group of items arranged in the sequence are presented to the user via the display. If a first one of the plurality of predefined gestures is received, the multiple items from the group of items arranged in the sequence are presented to the user via the display along a first path on the display. If a second one of the plurality of predefined gestures is received, the multiple items from the group of items arranged in the sequence are presented to the user via the display along a second path on the display, which is different from the first path.

In at least one embodiment, one of the multiple items being displayed from the group of items arranged in the sequence is centered relative to the other multiple items presented to the user, and the multiple items further include a predefined number of items from the group of items arranged in the sequence, which are immediately before the one of the multiple items that is centered in the sequence, and a predefined number of items from the group of items arranged in the sequence, which are immediately after the one of the multiple items that is centered in the sequence.

In at least a further embodiment, when one of a plurality of predefined gestures, which are intended to signal a desire to scroll through the group of items arranged in the sequence, is received via the user input, a different one of group of items arranged in a sequence is the centered one of multiple items being displayed, and the multiple items being displayed include a different subset of items from the group of items.

In at least a still further embodiment, a first one of the plurality of predefined gestures and the second one of the plurality of predefined gestures, respectively correspond to a scrolling of the group of items arranged in the sequence at different speeds.

The present invention further provides a method for presenting to a user of an electronic device via a display screen of the electronic device multiple items from a group of items arranged in a sequence. The method includes presenting to a user via a display multiple items from a group of items arranged in a sequence. At least one of multiple different user gestures are then received via a user input of the electronic device. The received gestures are then compared with one of a plurality of predefined gestures which are intended to signal a desire to scroll through the group of items arranged in a sequence of which multiple items from the group are being presented to the user via the display, where as the group of items are scrolled through, a different subset of multiple items from the group of items arranged in the sequence are presented to the user via the display. If a first one of the plurality of predefined gestures is received, then the multiple items from the group of items arranged in a sequence are presented to the user via the display along a first path on the display. If a second one of the plurality of predefined gestures is received, then the multiple items from the group of items arranged in a sequence are presented to the user via the display along a second path on the display, which is different from the first path.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. Furthermore, while the various figures are intended to illustrate the various claimed aspects of the present invention, in doing so, the elements are not necessarily intended to be drawn to scale. In other word, the size, shape and dimensions of some layers, features, components and/or regions for purposes of clarity or for purposes of better describing or illustrating the concepts intended to be conveyed may be exaggerated and/or emphasized relative to other illustrated elements.

Figure 1:
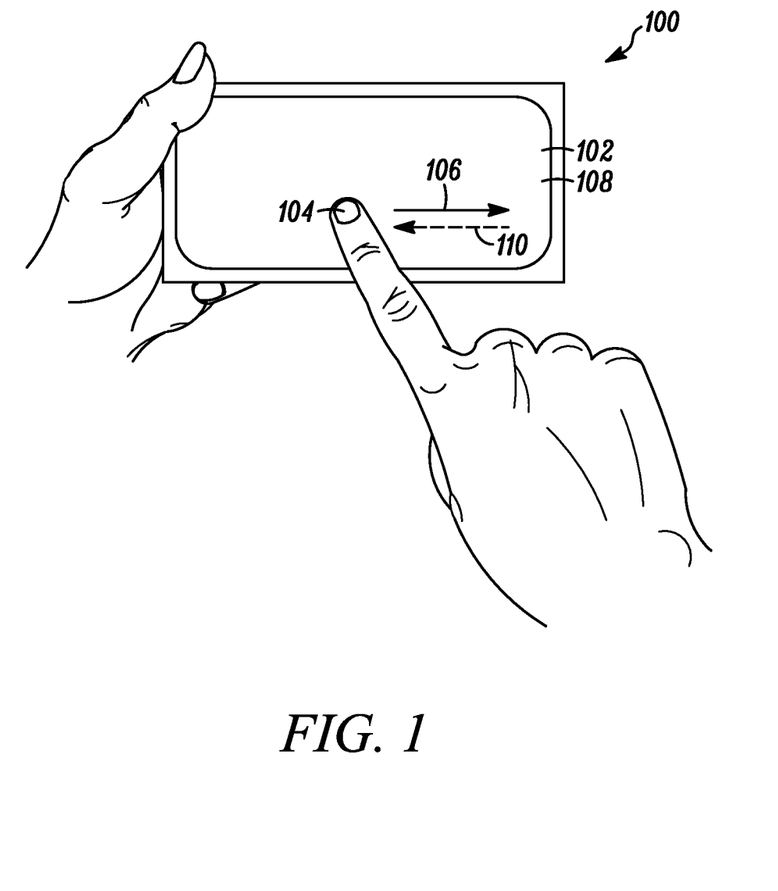
FIG. 1 is a plan view of an exemplary electronic device incorporating a display interface, such as a touch sensitive display for receiving user gestures, in accordance with at least one embodiment of the present invention.

FIG. 1 illustrates a plan view of an exemplary electronic device 100 incorporating a display interface, such as a touch sensitive display for receiving user gestures and presenting multiple items from a group of items arranged in sequence, in accordance with at least one embodiment of the present invention. The electronic device could be one of many different types of electronic devices including wireless communication devices, such as radio frequency (i.e. cellular) telephones, media (i.e. music) players, personal digital assistants, portable video gaming devices, cameras, and/or remote controls. The present invention is additionally suitable for electronic devices which present items for selection from a menu, which might be presented to a user.

In the illustrated embodiment, the electronic device is a hand-held electronic device, which includes a touch sensitive display 102 upon which a pointer, such as a user's finger 104, can trace patterns 106, which can be detected by a user input 108, such as a touch or proximity sensor array and can be interpreted as commands or gestures. In the illustrated embodiment, the sensor array is formed as part of the display assembly, and/or overlays the display screen in order that an interaction with the display surface can be detected by the device.

Generally, the touch or proximity sensor array can employ various types of touch or proximity sensing technologies including capacitive arrays as well as resistive arrays, the touch sensitive arrays can even employ force sensing resistor arrays, for detecting the amount of force being applied at the selected location. In this way, a force threshold determination can be taken into account in determining the intended interaction including the making of a gesture. However while a touch or proximity sensor array is illustrated, one skilled in the art will readily appreciate that other types of user input could alternatively be used to detect the performance by the user of a gesture that can be used to produce an actionable user selection or input. For example, accelerometers could be used to detect the movement of the device in a predesignated pattern, which might be recognizable as a user input command to be executed by the device. Alternatively, a directional pad, mouse, joystick and/or still other forms of inputs could similarly be used to convey a gesture that can be detected as a valid user input.

In some instances a particular controllable interface, such as the user input 108 may be responsive to more than one type of gesture that might produce a related but different effect. For example, a gesture including the repeated writing of a line having a length might cause a scrolling effect relative to group of items arranged in sequence resulting in a different subset of the items to be currently displayed. An amount corresponding to the length of the detected line 106 and/or the speed at which the line 106 is traced could be used to adjust a speed of the scrolling. By lifting the pointer 110 and repeating the line gesture 106 one might be able to produce a still further additive scrolling effect, thereby increasing the rate of scrolling in the same direction. The scrolling could be reversed by a line traced in the opposite direction. Alternatively, there could be a stop gesture, and/or the scrolling effect could gradually lose speed over time until the scrolling eventually stops.

Figure 2:
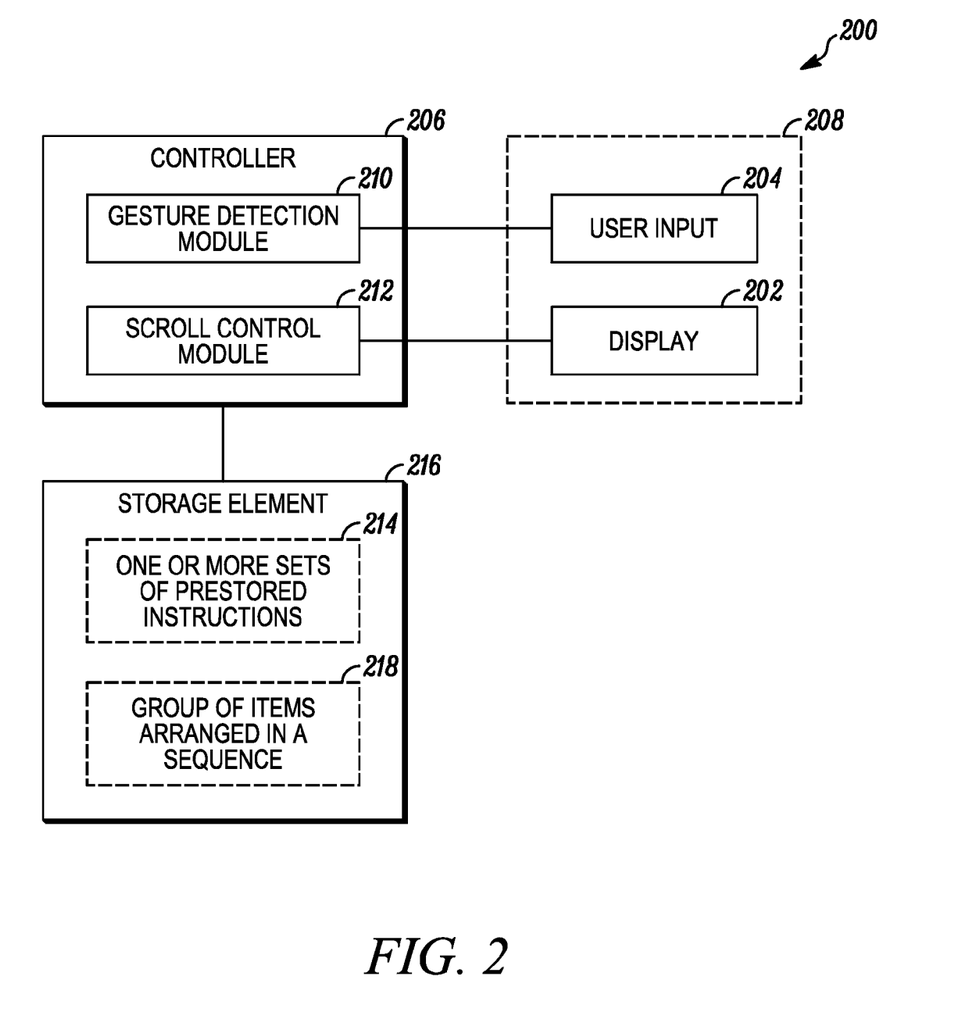
FIG. 2 is a block diagram of an electronic device incorporating a display interface, in accordance with at least one aspect of the present invention.

FIG. 2 illustrates a block diagram of an electronic device incorporating a display interface 200, in accordance with at least one aspect of the present invention. The display interface includes a display 202, a user input 204, and a controller 206. The display 202 is adapted for visually presenting to the user multiple items from a group of items arranged in a sequence. The user input 204 is adapted for receiving at least one of multiple different user gestures. As previously noted, the user input could be incorporated as part of a common assembly 208, which similarly includes the display 202. The display 202 and the user input 204 are coupled to the controller 206, which includes a gesture detection module 210 and a scroll control module 212. In some embodiments, the controller 206 could be implemented in the form of a microprocessor, which is adapted to execute one or more sets of prestored instructions 214, which may be used to form at least part of one or more controller modules 210 and 212. The one or more sets of prestored instructions 214 may be stored in a storage element 216, which is either integrated as part of the controller or is coupled to the controller 206. It is further possible that the storage element 216 might further include the group of items 218 arranged in a sequence, especially where the items may include digitally encoded elements, such as one or more pictures, one or more movies, one or more books, and/or one or more songs. The group of items can still further represent groups of pictures or groups of songs, such as an album. The group of items could also represent contacts in a phone book and may include a picture of each of the contacts. The group of items could still further represent a digital thumbnail representation of a home page for a group of websites that the user has a corresponding bookmark. Still further forms of graphical representations arranged in a menu type sequence are possible without departing from the teachings of the present invention.

The storage element 216 can include one or more forms of volatile and/or non-volatile memory, including conventional ROM, EPROM, RAM, or EEPROM. The storage element 216 may still further incorporate one or more forms of auxiliary storage, which is either fixed or removable, such as a harddrive or a floppydrive. One skilled in the art will still further appreciate, that still other further forms of memory could be used without departing from the teachings of the present invention. In the same or other instances, the controller 206 may additionally or alternatively incorporate state machines and/or logic circuitry, which can be used to implement at least partially, some of modules and their corresponding functionality.

In the illustrated embodiment, the gesture detection module 210 of the controller is adapted to compare a received gesture with one of a plurality of predefined gestures including a plurality of gestures, which are intended to signal a desire to scroll through the group of items, which are arranged in a sequence, such as a menu, and which can be selected by a user. The scroll control module 212 is adapted to present a different subset of the multiple items from the group of items arranged in a sequence as the group of items are scrolled through. The scroll control module 212 is further adapted to identify a first gesture, which can include a combination of gestures, which results in a scrolling of the multiple items along a first path, often the first path is associated with a scrolling at a first speed. The scroll control module 212 is further adapted to identify a second gesture, which can include a combination of gestures, which results in a scrolling of the multiple items along a second path. Correspondingly, the second path is often associated with a scrolling at a second speed. Further gestures associated with further paths are similarly possible without departing from the teachings of the present invention. In fact, FIGS. 3-5 illustrate three such exemplary paths.

Figure 3:
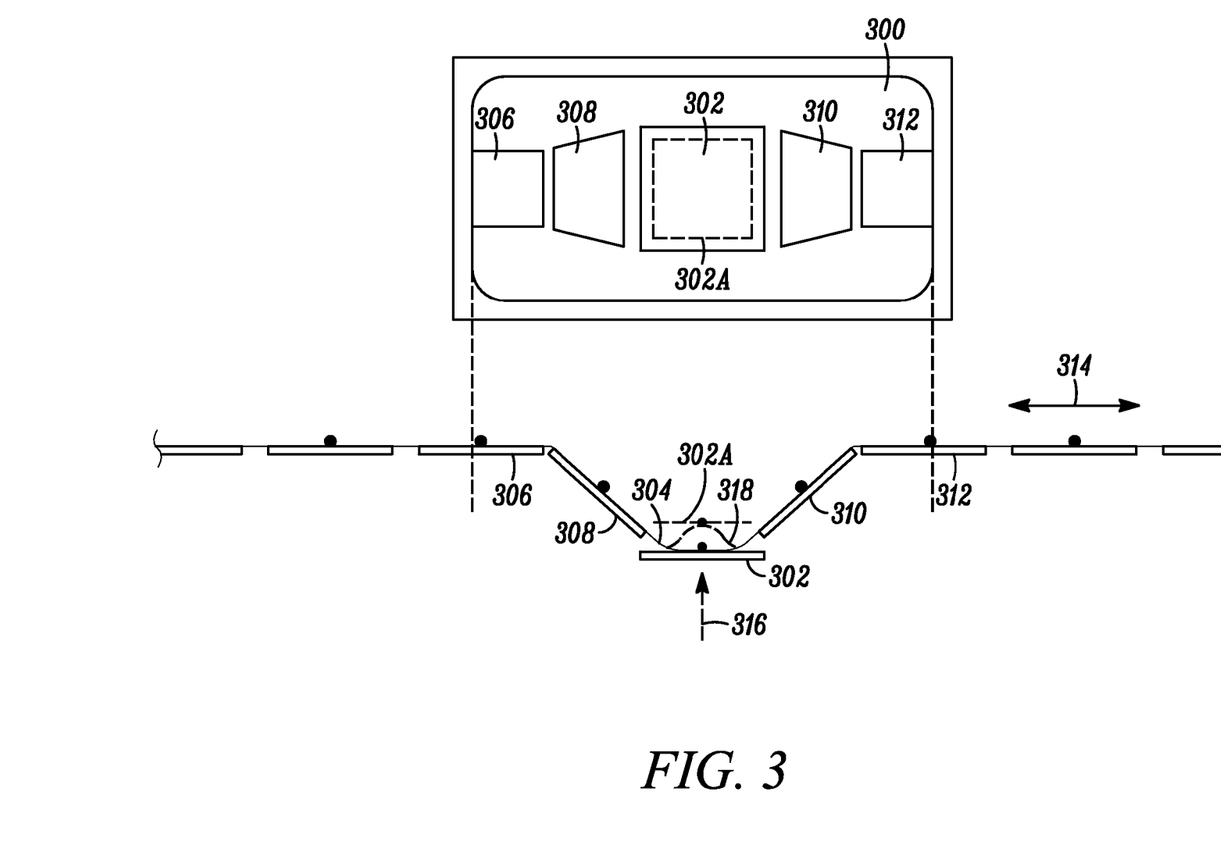
FIG. 3 is a plan view of a display for an electronic device presenting a virtual three dimensional representation of a sequence of two dimensional elements, and corresponding path that the two dimensional elements follow within the three dimensional space.
Figure 4:
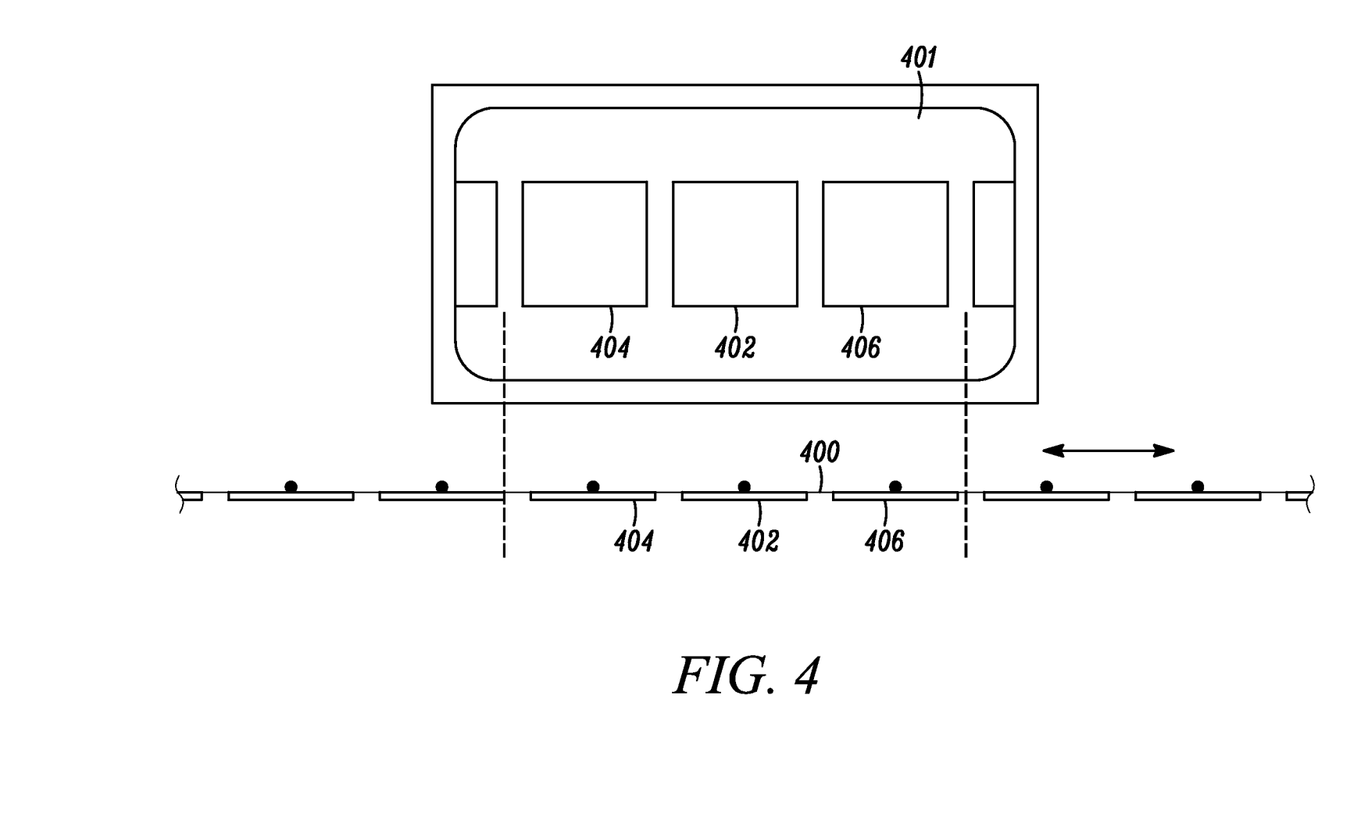
FIG. 4 is a further plan view of a display for an electronic device presenting a virtual three dimensional representation of a sequence of two dimensional elements, and corresponding path that the two dimensional elements follow within the three dimensional space.
Figure 5:
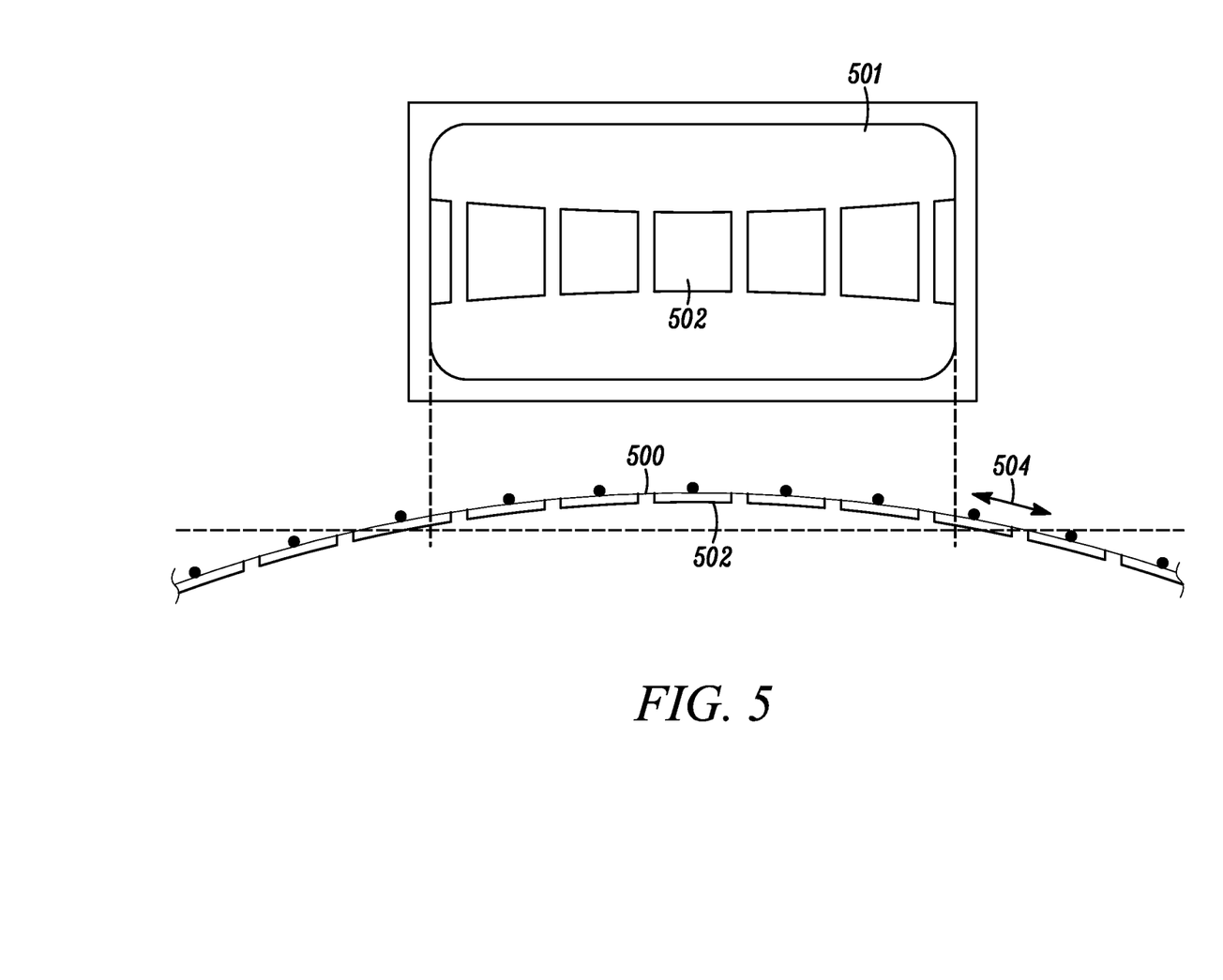
FIG. 5 is a still further plan view of a display for an electronic device presenting a virtual three dimensional representation of a sequence of two dimensional elements, and corresponding path that the two dimensional elements follow within the three dimensional space.

More specifically, FIGS. 3-5 illustrate plan views of a display for an electronic device presenting a virtual three dimensional representation of a sequence of two dimensional elements, and corresponding paths that the two dimensional elements follow within the three dimensional space. The paths are shown from a look down perspective.

In FIG. 3, the centered item 302 in the display window 300 follows a path 304, which positions the centered item 302 in a position which projects forward toward the user. Because the view is illustrated in a perspective format, the items that are closer to the user appear larger in the display window 300. Not every item in the group of items in a sequence appears in the display 300. The items which appear in the display include the centered item 302, and a finite number of immediately adjacent items both before and after the centered item 302 in the sequence. In the illustrated embodiment, two items immediately adjacent to the centered item 302 both before (items 306 and 308) and after (items 310 and 312) are included. Before and after are relative terms, and could readily be interchanged, but even if interchanged would still represent items on opposite sides of the centered item 302. In some cases before and after could be based upon a direction of travel, if and when, the items are scrolling 314. In the present instance, before represents the items to the left of the centered item, and after represents the items to the right of the centered item, which is consistent with the direction in which English text is read.

As the items are scrolled on screen, a different one of the multiple items from the group of items is treated as the centered item, and some of the previously displayed items may no longer be visible, while other items may be newly visible. In the illustrated embodiment, the centered item has further significance, in that in its position of prominence, it is the item that can be selected to initiate a selection action, and the increased size enables a greater amount of graphical detail to be presented. When selected, via for example a touching 316 of the element upon the screen, at least a momentary deflection 318 occurs in the path of travel, that alters the size of the element 302A, which provides a visual confirmation of selection. The deflected element 302A is illustrated with dashed lines.

If a non-centered item is selected or touched by the user, the touched item could then become the new centered item, for example through a scrolling in the appropriate direction.

In at least the present embodiment, the illustrated path, illustrated in FIG. 3, corresponds to multiple items which are at rest (i.e. not scrolling), or are scrolling slowly.

In FIG. 4, the results of an alternative path 400 are illustrated. In this illustrated embodiment, the path 400 is largely linear, which results in several equally sized elements, whose facings are all largely parallel to the display 401 plane. Such an orientation makes it easier to see the image of the elements immediately before (i.e. element 404) and immediately after (i.e. element 406) the centered item 402. Such a path 400 could corresponds to a speed of scrolling that is faster than the speed associated with the path 304 illustrated in FIG. 3.

In FIG. 5, the results of a further alternative path 500 are illustrated. In this illustrated embodiment, the path 500 is moderately concave from the direction of the view plane, which results in the elements being still smaller, which enables a larger number of elements to be visible via the display 501 at the same time, where two immediately adjacent items are fully visible both before and after the centered item 502. In this way, as the items scroll across the screen, the items will be visible for a slightly larger number of different centered items 502. This allows the items to remain visible for a longer period of time than if fewer elements were displayed at any one time, thereby enabling a longer viewing period, which would accommodate an even faster scrolling 504 rate. Each of the paths could be associated with a different gesture, which may correspondingly be associated with a different scrolling speed.

In this way, multiple paths can be used to alternatively enhance a level of detail, or the amount of viewing time associated with a particular displayed item as the items are scrolled across the display.

While the exemplary embodiments illustrate three different paths, as few as two paths, as well as a number that exceeds three different paths, used together, are possible without departing from the teachings of the present invention.

In at least some instances each path is represented by a virtual string or ribbon along which the group of items arranged in sequence are attached, enabling the two dimensional representation of items to be arranged approximately end to end along a path. If the distance between attachment points is increased, there may be greater spacing between adjacent elements. If the distance between attachment points is decreased, there may be less spacing and potentially some overlap between adjacent elements.

Figure 6:
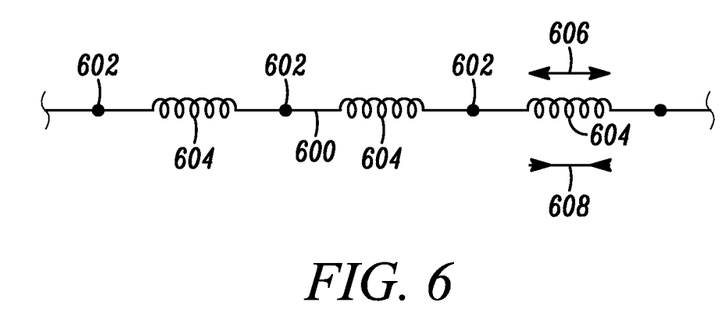
FIG. 6 is a schematic diagram of a portion of a virtual string which extends along the path, the virtual string including anchor points connected to the elements to be presented for purposes of modeling the movement of the elements.

FIG. 6 illustrates a schematic diagram of a portion of a virtual string which extends along the path. The virtual string includes anchor points connected to the elements to be presented for purposes of modeling the movement of the elements. In the illustrated embodiment, a virtual string or ribbon 600 is illustrated, which would follow an appropriate path. At various spacings along the length of the virtual string 600, are attachment points 602. The attachment points 602, represent the point at which a corresponding one of the items in the group of items will attach to the virtual string 600, as the virtual string moves along the currently selected path. In the illustrated embodiment, a spring 604 is illustrated between each set of attachment points, such an arrangement highlights the possibility of a physics model which allow the spacing between attachment points 602, and correspondingly the items attached thereto, to grow and shrink.

In such a model, the items could have a mass, and the scroll force could be applied to one or more of the attached items. The inertia associated with an adjacent item would initially resist movement until the force translated through the spring 604 accelerated the adjacent item up to an equivalent velocity. Such a modeling would allow for a more complex dynamic between the items in sequence, which might provide a more pleasing viewer experience, as the experience becomes more interactive with a greater degree of effects through the user interaction. Just as the spring 604 could stretch 606, the spring could similarly compress 608, thereby resulting in a still further set of more complex interactions.

Figure 7:
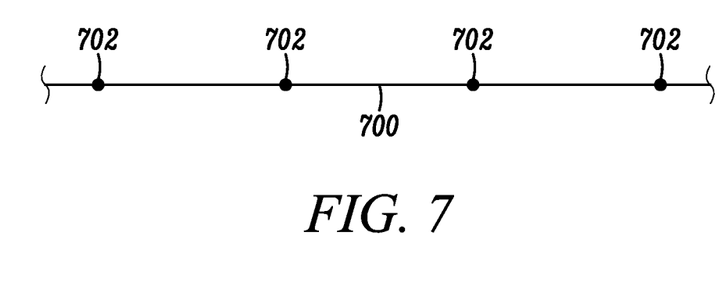
FIG. 7 is a further schematic diagram of a portion of a virtual string which extends along the path, the virtual string including anchor points connected to the elements to be presented for purposes of modeling the movement of the elements.

However, whereas the spacing between attachment points 602 are allowed to vary, in the embodiment illustrated in FIG. 6, FIG. 7 illustrates a further schematic diagram of a portion of a virtual string 700 which extends along the path, where the virtual string 700 includes anchor points 702 to be connected to the items from the group of items arranged in a sequence, which could be largely static in their spacing.

Still further, the items attached via the attachment points could represent a single item or could represent an arranged group of items such as a group of pictures, songs, bookmarks, etc., that are associated in some way. The grouping could be based upon similarity in subject matter, proximity in time, common authorship, or some other way in which items can be grouped. Still further single items could be arranged in sequence with items intended to represent multiple elements. In such an instance, it may be helpful to graphically convey, the items intended to represent multiple items.

Figure 8:
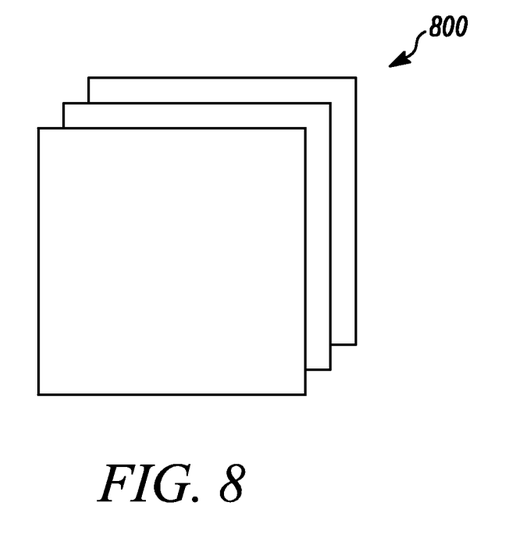
FIG. 8 is a plan view of a two dimensional element intended to represent a stack of multiple elements.
Figure 9:
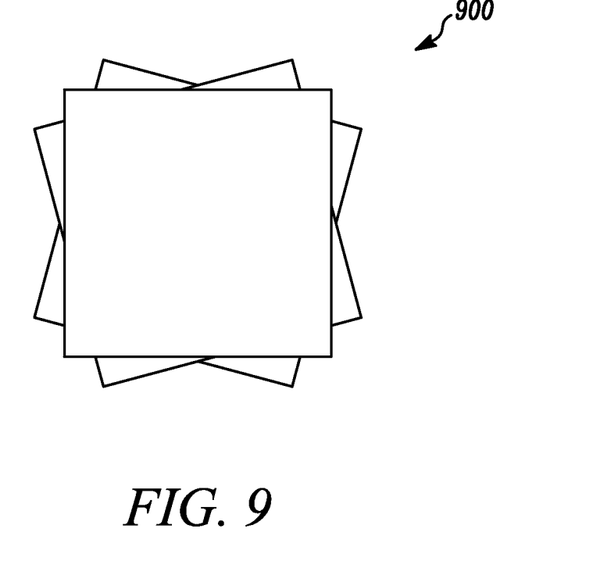
FIG. 9 is a further plan view of a two dimensional element intended to represent a stack of multiple elements.

FIG. 8 illustrates a plan view of a two dimensional element intended to represent a stack 800 of multiple elements. FIG. 9 illustrates a further plan view of a two dimensional element intended to represent an alternative stack 900 of multiple elements. Furthermore, the degree of uniformity of the stack 800, as highlighted in FIG. 8, may highlight that a degree of user organization has been imposed on the grouping by the user, where a relatively more random or haphazard stack 900 might convey to the user that the organization was a little more impromptu, or with a looser grouping criteria. Still further, it is possible to have multiple different styles of more random stacks so as to not look artificially uniform in their similarity. Often times a set of 3 or 4 different styles of random stacks intermixed together will produce enough variability to break up the patterns between stacks represented by a similar graphic, so that the randomness associated with a particular grouping does not appear contrived.

While the stacks have a border which suggests that the element represents a grouping of element, a general theme or a representative element could be conveyed by using the graphical representation of one of the items contained in the stack to be used as part of display of any arranged sequence, in order that a user can more readily identify the stack. For example, a particular stack might include pictures from a recent trip or from a particular event. A representative one of the pictures may be sufficient to identify that further related pictures are part of the same stack.

Figure 10:
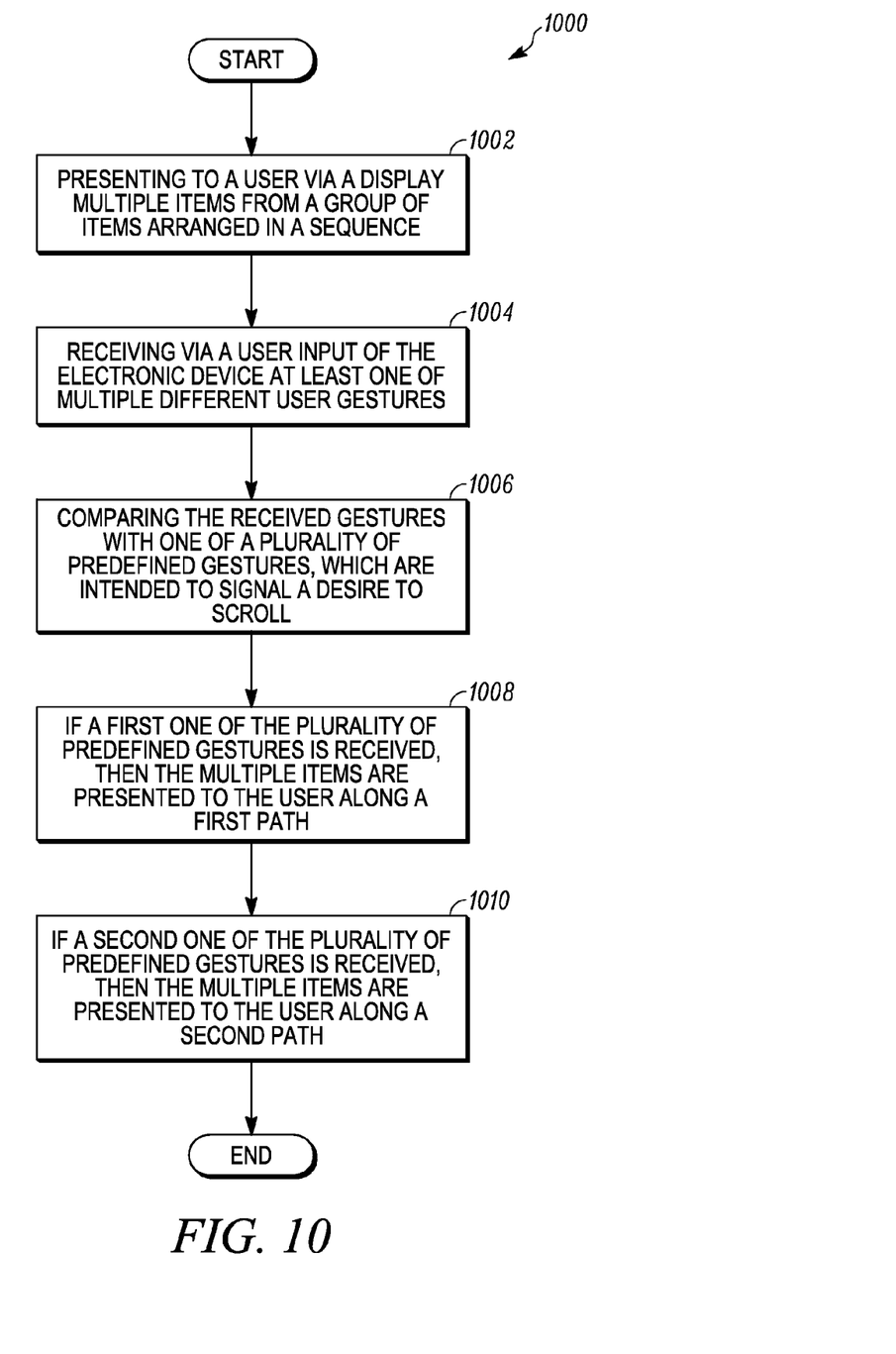
FIG. 10 is a flow diagram of a method for presenting multiple items from a group of items arranged in a sequence.

FIG. 10 illustrates a flow diagram of a method 1000 for presenting multiple items to a user via a display from a group of items arranged in a sequence. The method 1000 includes presenting 1002 to a user via a display multiple items from a group of items arranged in a sequence. At least one of multiple different user gestures are then received 1004 via a user input of the electronic device. The received gestures are then compared 1006 with one of a plurality of predefined gestures which are intended to signal a desire to scroll through the group of items arranged in a sequence of which multiple items from the group are being presented to the user via the display, where as the group of items are scrolled through, a different subset of multiple items from the group of items arranged in the sequence are presented to the user via the display. If a first one of the plurality of predefined gestures is received, then the multiple items from the group of items arranged in a sequence are presented 1008 to the user via the display along a first path on the display. If a second one of the plurality of predefined gestures is received, then the multiple items from the group of items arranged in a sequence are presented 1010 to the user via the display along a second path on the display, which is different from the first path.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A display interface for presenting to a user of an electronic device multiple items from a group of items arranged in a sequence, the display interface comprising:

a display adapted for visually presenting to the user the multiple items from the group of items arranged in the sequence;

a user input adapted for receiving at least one of multiple different user gestures;

a controller adapted for comparing a received user gesture with one of a plurality of predefined gestures which are intended to signal a desire to scroll through the group of items arranged in the sequence, where as the group of items are scrolled through, a different subset of multiple items from the group of items arranged in the sequence are presented to the user via the display;

wherein if a first one of the plurality of predefined gestures is received, the multiple items from the group of items arranged in the sequence are presented to the user via the display along a first path on the display, and if a second one of the plurality of predefined gestures is received, the multiple items from the group of items arranged in the sequence are presented to the user via the display along a second path on the display, which is different from the first path;

where the sequential arrangement of the group of items includes a virtual string, which follows a currently selected one of multiple paths that include the first path and the second path, where at spaced intervals along a length of the virtual string respective ones of the group of items are attached in an order corresponding to the sequential arrangement; and where the virtual string and the attached items move along the currently selected one of multiple paths as part of a scrolling of the group of items, and where the virtual string is elastic and the attached items have a virtual mass where an inertia associated with the attached item as the scrolling of the group of items, and correspondingly the string, changes velocity and can cause the spacing between adjacent items attached to the string to increase and decrease.

2. A display interface in accordance with claim 1, where one of the multiple items being displayed from the group of items arranged in the sequence is centered relative to the other multiple items presented to the user, and the multiple items further include a predefined number of items from the group of items arranged in the sequence, which are immediately before the one of the multiple items that is centered in the sequence, and a predefined number of items from the group of items arranged in the sequence, which are immediately after the one of the multiple items that is centered in the sequence.

3. A display interface in accordance with claim 2, where when one of a plurality of predefined gestures, which are intended to signal a desire to scroll through the group of items arranged in the sequence, is received via the user input, a different one of group of items arranged in a sequence is the centered one of multiple items being displayed, and the multiple items being displayed include a different subset of items from the group of items.

4. A display interface in accordance with claim 2, where the predefined number of items from the group of items arranged in the sequence, which are immediately before the one of the multiple items that is centered in the sequence, is equal to the predefined number of items from the group of items arranged in the sequence, which are immediately after the one of the multiple items that is centered in the sequence.

5. A display interface in accordance with claim 2, where the multiple items being displayed from the group of items arranged in the sequence are displayed in sequential order, with the predefined number of multiple items from the group of items arranged in the sequence, which are immediately before the one of the multiple items that is centered in the sequence, are displayed to a first side of the one of the multiple items that is centered in the sequence, where the multiple items that are more immediately adjacent to the one of the multiple items that is centered in the sequence are displayed closer to the centered one of the multiple items, and the predefined number of multiple items from the group of items arranged in the sequence, which are immediately after the one of the multiple items that is centered in the sequence, are displayed to a second side different from the first side of the one of the multiple items that is centered in the sequence, where the multiple items that are more immediately adjacent to the one of the multiple items that is centered in the sequence are displayed closer to the centered one of the multiple items.

6. A display interface in accordance with claim 1, where the spaced intervals along the length of the virtual string, when the virtual string is unstretched, are equivalent in length.

7. A display interface in accordance with claim 1, where the display presents a virtual three dimensional representation of the multiple items.

8. A display interface in accordance with claim 7, where the attached items are virtual two dimensional images that are virtually represented in the three dimensional space, so as to appear tangent to the virtual string at the point of attachment.

9. A display interface in accordance with claim 7, where at least one of the first path and the second path is non-linear within the virtually represented three dimensional space.

10. A display interface in accordance with claim 1, where the user input is incorporated in the display.

11. A display interface in accordance with claim 10, where at least some of the plurality of predefined gestures include one or more user interactions that have a spatial relationship relative to the multiple items being visually presented.

12. A display interface in accordance with claim 1, where a first one of the plurality of predefined gestures and the second one of the plurality of predefined gestures, respectively correspond to a scrolling of the group of items arranged in the sequence at different speeds.

13. A display interface in accordance with claim 1, where said electronic device is a hand-held electronic device.

14. A display interface in accordance with claim 13, where the electronic device is a wireless communication device.

15. A method for presenting to a user of an electronic device via a display screen of the electronic device multiple items from a group of items arranged in a sequence, the method comprising:

presenting to a user via a display multiple items from a group of items arranged in a sequence;

receiving via a user input of the electronic device at least one of multiple different user gestures;

comparing the received gestures with one of a plurality of predefined gestures which are intended to signal a desire to scroll through the group of items arranged in a sequence of which multiple items from the group are being presented to the user via the display, where as the group of items are scrolled through, a different subset of multiple items from the group of items arranged in the sequence are presented to the user via the display;

where if a first one of the plurality of predefined gestures is received, the multiple items from the group of items arranged in a sequence are presented to the user via the display along a first path on the display; and where if a second one of the plurality of predefined gestures is received, the multiple items from the group of items arranged in a sequence are presented to the user via the display along a second path on the display, which is different from the first path;

where the sequential arrangement of the group of items includes a virtual string, which follows a currently selected one of multiple paths that include the first path and the second path, where at spaced intervals along a length of the virtual string respective ones of the group of items are attached in an order corresponding to the sequential arrangement; and where the virtual string and the attached items move along the currently selected one of multiple paths as part of a scrolling of the group of items, and where the virtual string is elastic and the attached items have a virtual mass where an inertia associated with the attached item as the scrolling of the group of items, and correspondingly the string, changes velocity and can cause the spacing between adjacent items attached to the string to increase and decrease.

16. A method in accordance with claim 15, where one of the multiple items being displayed from the group of items arranged in the sequence is centered relative to the other multiple items presented to the user, and the multiple items further include a predefined number of items from the group of items arranged in the sequence, which are immediately before the one of the multiple items that is centered in the sequence, and a predefined number of items from the group of items arranged in the sequence, which are immediately after the one of the multiple items that is centered in the sequence.

17. A method in accordance with claim 16, where when one of a plurality of predefined gestures, which are intended to signal a desire to scroll through the group of items arranged in the sequence, is received via the user input, a different one of group of items arranged in a sequence is the centered one of multiple items being displayed, and the multiple items being displayed include a different subset of items from the group of items.

18. A display interface in accordance with claim 15, where at least one of the first path and the second path is non-linear within a virtually represented three dimensional space.

* * * * *